United States Patent
Dong et al.

(10) Patent No.: US 8,635,867 B2
(45) Date of Patent: Jan. 28, 2014

(54) HYDROSTATIC TRANSMISSION

(75) Inventors: Xingen Dong, Greeneville, TN (US);
Barun Acharya, Johnson City, TN (US);
Frank P. Holzschuh, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 814 days.

(21) Appl. No.: 11/183,177

(22) Filed: Jul. 15, 2005

(65) Prior Publication Data

US 2006/0039801 A1 Feb. 23, 2006

Related U.S. Application Data

(60) Provisional application No. 60/588,125, filed on Jul. 15, 2004.

(51) Int. Cl.
*F16D 31/02* (2006.01)
*F16D 39/00* (2006.01)
*F04B 1/12* (2006.01)

(52) U.S. Cl.
USPC .............. 60/485; 417/269; 60/487; 60/464

(58) Field of Classification Search
USPC ............ 417/269, 271, 222.1; 74/606; 60/435, 60/487, 485, 484; 475/198; 474/166; 476/15; 477/38
See application file for complete search history.

(56) References Cited

U.S. PATENT DOCUMENTS

| 2,495,685 | A | | 1/1950 | Beaman et al. | |
|---|---|---|---|---|---|
| 2,834,297 | A | * | 5/1958 | Postel et al. | 91/506 |
| 2,936,589 | A | * | 5/1960 | Quintilian | 60/464 |
| 2,988,007 | A | * | 6/1961 | Quintilian | 418/27 |
| 3,090,456 | A | | 5/1963 | Blenke | |
| 3,177,665 | A | | 4/1965 | Power | |
| 3,485,315 | A | * | 12/1969 | Bergren | 180/306 |
| 3,493,067 | A | | 2/1970 | Rumsey | |
| 3,643,434 | A | * | 2/1972 | Widmaier | 60/437 |
| 3,864,916 | A | * | 2/1975 | Maistrelli et al. | 60/485 |
| 3,890,783 | A | * | 6/1975 | Allen et al. | 60/420 |
| 3,949,824 | A | | 4/1976 | Bennett | |
| 4,064,766 | A | * | 12/1977 | Rinaldo | 74/473.11 |
| 4,070,219 | A | * | 1/1978 | Farnam | 156/192 |
| 4,071,106 | A | | 1/1978 | Junck et al. | |
| 4,105,369 | A | | 8/1978 | McClocklin | |

(Continued)

FOREIGN PATENT DOCUMENTS

| GB | 2 062 187 | 5/1981 |
|---|---|---|
| JP | 01300073 | 12/1989 |
| JP | 2001220770 | 8/2001 |

OTHER PUBLICATIONS

Brochure; "TRW Ross Gear Torqdrive Axle"; Sep. 2003.

(Continued)

*Primary Examiner* — Charles Freay
*Assistant Examiner* — Alexander Comley
(74) *Attorney, Agent, or Firm* — Renner, Otto, Boisselle & Sklar, LLP

(57) ABSTRACT

A compact, integrated hydrostatic transmission without reduction gearing wherein the pump and motor are contained within a single housing, and an output shaft extends from the housing inline with a shaft of the motor. The output shaft is directly connectable to a wheel of a vehicle. The pump and motor share a common sump within the housing in which pump and/or motor leakage is collected.

16 Claims, 15 Drawing Sheets

(56) References Cited

U.S. PATENT DOCUMENTS

| | | | | |
|---|---|---|---|---|
| 4,171,559 A | * | 10/1979 | Vyse et al. | 29/407.01 |
| 4,285,643 A | | 8/1981 | White | |
| 4,373,600 A | | 2/1983 | Buschbom et al. | |
| 4,580,646 A | | 4/1986 | Tokunaga | |
| 4,616,478 A | * | 10/1986 | Jensen | 60/487 |
| 4,627,237 A | * | 12/1986 | Hutson | 60/487 |
| 4,666,091 A | | 5/1987 | von der Heide | |
| 4,843,817 A | | 7/1989 | Shivvers et al. | |
| 4,845,949 A | | 7/1989 | Shivvers et al. | |
| 4,870,820 A | * | 10/1989 | Nemoto | 60/487 |
| 4,903,792 A | | 2/1990 | Ze-ying | |
| 4,936,095 A | * | 6/1990 | Ross et al. | 60/444 |
| 5,018,351 A | * | 5/1991 | Otte | 60/448 |
| 5,046,994 A | | 9/1991 | Hasegawa et al. | 475/83 |
| 5,181,837 A | * | 1/1993 | Niemiec | 417/350 |
| 5,203,169 A | | 4/1993 | Ishii et al. | |
| 5,205,123 A | * | 4/1993 | Dunstan | 60/487 |
| 5,317,936 A | * | 6/1994 | Shiba et al. | 74/606 R |
| 5,356,347 A | * | 10/1994 | Komura et al. | 474/28 |
| 5,363,740 A | | 11/1994 | Coakley | |
| 5,373,697 A | * | 12/1994 | Jolliff et al. | 60/454 |
| 5,394,699 A | | 3/1995 | Matsufuji | |
| 5,396,768 A | * | 3/1995 | Zulu | 60/487 |
| 5,473,964 A | | 12/1995 | Okada et al. | |
| 5,497,623 A | * | 3/1996 | Hauser et al. | 60/487 |
| 5,540,563 A | | 7/1996 | Hansell | |
| 5,557,931 A | * | 9/1996 | Hauser et al. | 60/455 |
| 5,622,051 A | | 4/1997 | Iida et al. | |
| 5,910,060 A | | 6/1999 | Blume | |
| 5,918,691 A | | 7/1999 | Ishii | |
| 5,921,151 A | * | 7/1999 | Louis et al. | 74/606 R |
| 5,950,500 A | * | 9/1999 | Okada et al. | 74/606 R |
| 5,979,270 A | * | 11/1999 | Thoma et al. | 74/606 R |
| 6,010,423 A | * | 1/2000 | Jolliff et al. | 475/93 |
| 6,030,182 A | * | 2/2000 | Voigt | 417/222.1 |
| 6,073,443 A | | 6/2000 | Okada et al. | |
| RE36,807 E | * | 8/2000 | Okada | 60/454 |
| 6,152,247 A | | 11/2000 | Sporrer et al. | |
| 6,167,619 B1 | | 1/2001 | Beagle | |
| 6,176,086 B1 | | 1/2001 | Betz | |
| 6,209,928 B1 | * | 4/2001 | Benett et al. | 285/124.1 |
| 6,220,377 B1 | * | 4/2001 | Lansberry | 180/9.36 |
| 6,233,929 B1 | | 5/2001 | Okada et al. | |
| 6,237,332 B1 | * | 5/2001 | Thoma et al. | 60/456 |
| 6,276,840 B1 | | 8/2001 | Weiss et al. | |
| 6,324,962 B1 | * | 12/2001 | Majkrzak | 92/163 |
| 6,343,471 B1 | * | 2/2002 | Thoma et al. | 60/487 |
| 6,363,815 B1 | * | 4/2002 | Ishimaru et al. | 74/730.1 |
| 6,425,244 B1 | * | 7/2002 | Ohashi et al. | 60/464 |
| 6,427,442 B2 | * | 8/2002 | Thoma et al. | 60/456 |
| 6,427,443 B2 | * | 8/2002 | Smothers et al. | 60/488 |
| 6,477,838 B1 | * | 11/2002 | Thoma et al. | 60/487 |
| 6,481,203 B1 | * | 11/2002 | Johnson et al. | 60/487 |
| 6,487,856 B1 | * | 12/2002 | Ohashi et al. | 60/464 |
| 6,487,857 B1 | | 12/2002 | Poplawski et al. | |
| 6,508,059 B1 | * | 1/2003 | Takada et al. | 60/454 |
| 6,543,560 B1 | * | 4/2003 | Trefz et al. | 180/53.4 |
| 6,550,243 B2 | | 4/2003 | Hauser et al. | |
| 6,554,084 B1 | | 4/2003 | Enmeiji | |
| 6,564,550 B2 | * | 5/2003 | Thoma et al. | 60/487 |
| 6,592,290 B2 | | 7/2003 | Jaszkowiak | |
| 6,592,336 B1 | | 7/2003 | Hirano et al. | |
| 6,598,694 B2 | | 7/2003 | Forster | |
| 6,643,959 B2 | * | 11/2003 | Jolliff et al. | 37/244 |
| 6,672,058 B1 | * | 1/2004 | Langenfeld et al. | 60/487 |
| 6,672,843 B1 | * | 1/2004 | Holder et al. | 417/201 |
| 6,675,696 B1 | | 1/2004 | Langenfeld | |
| 6,688,417 B2 | | 2/2004 | Hansell | |
| 6,694,729 B1 | * | 2/2004 | Trimble | 60/444 |
| 6,715,284 B1 | | 4/2004 | Poplawski et al. | |
| 6,736,605 B2 | | 5/2004 | Ohashi et al. | |
| 6,779,421 B2 | * | 8/2004 | Arnold et al. | 74/730.1 |
| 6,782,797 B1 | | 8/2004 | Brandenburg et al. | |
| 6,799,346 B2 | | 10/2004 | Jeng et al. | |
| 6,804,958 B1 | | 10/2004 | Poplawski et al. | |
| 6,817,960 B2 | * | 11/2004 | Jolliff et al. | 475/83 |
| 6,843,056 B1 | | 1/2005 | Langenfeld et al. | |
| 6,953,327 B1 | | 10/2005 | Hauser et al. | |
| 6,955,046 B1 | | 10/2005 | Holder et al. | |
| 6,973,783 B1 | * | 12/2005 | Hauser et al. | 60/484 |
| 6,988,580 B2 | | 1/2006 | Ohashi et al. | |
| 7,036,311 B2 | | 5/2006 | Hauser et al. | |
| 7,056,101 B1 | | 6/2006 | Hauser et al. | |
| 7,082,759 B1 | | 8/2006 | Tsukamoto et al. | |
| 7,137,250 B1 | | 11/2006 | McCoy et al. | |
| 7,308,790 B1 | | 12/2007 | Bennett et al. | |
| 7,309,301 B2 | | 12/2007 | Janson et al. | |
| 7,316,287 B2 | | 1/2008 | Ohashi et al. | |
| 7,370,714 B2 | | 5/2008 | Yasuda et al. | |
| 7,392,654 B1 | | 7/2008 | Hauser et al. | |
| 7,455,132 B2 | | 11/2008 | Acharya et al. | |
| 7,455,144 B2 | | 11/2008 | Ohashi et al. | |
| 2002/0179340 A1 | | 12/2002 | Jolliff et al. | |
| 2003/0070429 A1 | | 4/2003 | Jolliff et al. | |
| 2003/0116936 A1 | | 6/2003 | Felsing et al. | |
| 2004/0126279 A1 | * | 7/2004 | Renzi et al. | 422/100 |
| 2006/0039801 A1 | | 2/2006 | Dong et al. | |
| 2007/0017712 A1 | | 1/2007 | Dunn | |

OTHER PUBLICATIONS

Brochure; "The Latest from Hydro-Gear"; date unknown.
Office Action for U.S. Appl. No. 11/467,375, dated Jun. 24, 2008.
Notice of Allowance for U.S. Appl. No. 11/467,375, dated Dec. 19, 2008.
Office Action for U.S. Appl. No. 11/536,358, dated Aug. 6, 2008.
Office Action for U.S. Appl. No. 11/536,358, dated Mar. 24, 2009.
Notice of Allowance for U.S. Appl. No. 11/536,358, dated Aug. 3, 2009.
Supplemental Notice of Allowance for U.S. Appl. No. 11/536,358, dated Aug. 21, 2009.
Office Action for U.S. Appl. No. 11/551,524, dated Jul. 22, 2008.
Notice of Allowance for U.S. Appl. No. 11/551,524, dated Dec. 9, 2008.
Office Action for U.S. Appl. No. 11/563,122, dated Mar. 31, 2009.
Office Action for U.S. Appl. No. 11/761,651, dated Apr. 13, 2009.

* cited by examiner

HYDROSTATIC TRANSMISSION

RELATED APPLICATION

This application claims the benefit of U.S. Provisional Application No. 60/588,125 filed Jul. 15, 2004, which is hereby incorporated herein by reference.

FIELD OF THE INVENTION

The present invention relates generally to hydrostatic transmissions. More particularly, the invention relates to hydrostatic transmissions for use in vehicles, such as mowing machines.

BACKGROUND OF THE INVENTION

Hydrostatic transmissions have many uses, including the propelling of vehicles, such as mowing machines, and offer a stepless control of the machine's speed. A typical hydrostatic transmission system includes a variable displacement main hydraulic pump connected in a closed hydraulic circuit with a fixed displacement hydraulic motor. The closed hydraulic circuit includes a first conduit connecting the main pump outlet with the motor inlet and a second conduit connecting the motor outlet with a pump inlet. Either of these conduits may be the high pressure line depending upon the direction of pump displacement from neutral. For most applications, the pump is driven by a prime mover, such as an internal combustion engine or an electrical motor, at a certain speed in a certain direction. Changing the displacement of the pump will change its output flow rate, which controls the speed of the motor. Pump outflow can be reversed, thus reversing the direction of the motor. In a vehicle, the motor is typically generally connected through suitable gearing to the vehicle's wheels or tracks.

Fluid connections between the pump, motor and conduits should generally be leak free. However, as is often the case, the hoses or other conduits connecting the pump and motor can leak causing a loss of hydraulic fluid and a decrease in transmission performance. In response to the leakage problem, prior art hydrostatic transmissions were created which generally prevent leakage of fluid from the pump and motor by containing the leakage and returning it to the closed hydraulic circuit as needed. However, these prior art transmissions are typically large, expensive and complex, and often include reduction gearing which further increases the size, cost and complexity of the transmission.

SUMMARY OF THE INVENTION

The present invention provides a compact, integrated hydrostatic transmission without reduction gearing wherein the pump and motor are contained within a single housing, and an output shaft extends from the housing inline with the rotational axis of the motor. The output shaft may have a portion thereof forming an axle to which a wheel of a vehicle may be mounted. The pump and motor preferably share a common sump within the housing that collects pump and/or motor leakage. The invention also provides a unique way of sealing passages between housing parts that eliminates the need for high pressure gaskets at the mating faces of the housing parts.

Accordingly, the invention provides a hydrostatic transmission comprising a hydraulic pump, an input shaft for rotatably driving the hydraulic pump, an output shaft, a hydraulic motor for driving the output shaft, and a housing enclosing at least a portion of the hydraulic pump and the hydraulic motor. The hydraulic pump and hydraulic motor share a common sump within the housing, and the output shaft extends through a wall of the housing in axial alignment with the rotational axis of the pump.

In a preferred embodiment, the hydraulic pump and the hydraulic gear motor to form part of a closed hydraulic loop that further includes at least one passageway formed in the housing. The hydraulic pump may be a piston pump and the hydraulic motor may be a gear motor, such as a gerotor. The hydraulic motor may be mounted to and carried by a mounting plate that is removably attachable to the housing. The mounting plate permits installation of the motor within the housing as a unit.

The hydrostatic transmission can be mounted to the frame of a vehicle, and a wheel can be mounted to an outer axle portion of the output shaft of the motor for supporting the vehicle for movement over the ground.

In accordance with another aspect of the invention, a hydrostatic transmission is provided including a pump, a motor, and a housing containing at least one of the pump and the motor. The housing has first and second mating parts each including a fluid passageway for fluidly connecting the pump and the motor. The fluid passageways of the first and second mating parts open to mating faces thereof for receiving a seal insert. The seal insert has an insert passageway that extends from an opening at one end of the insert to an opening at the other end of the insert for providing a flow passage therethrough. The insert passageway is in communication with the respective passageways of the first and second mating parts, and a sealing element, such as an O-ring, is disposed at each end of the seal insert for sealing an outer diameter of the seal insert to an inner diameter of the passageways of the first and second mating parts.

The fluid passageways in the first and second mating parts may each have counterbores for receiving and axially positioning the seal insert. Circumferential recesses may be provided on the outer diameter of the seal insert for retaining the sealing elements.

In accordance with another aspect of the invention, a hydrostatic transmission is provided comprising a pump, a motor, and a housing containing the pump and at least a part of the motor. The pump includes an input shaft and at least one control member for controlling pump flow output. The housing includes opposed side wall portions aligned in a direction parallel to the rotation axis of the input shaft, either one of the side wall portions being selectable to provide thereon a through hole for passage of a rotatable actuating member from the exterior of the housing to the interior of the housing for connecting to the control member. The actuating member is mounted for rotation and coupled to the control member for control of the pump flow output. Each of the opposed sidewall portions can include a preformed recess in which the through hole can be located, the preformed recess corresponding to a location at which the actuating member can be coupled to the control member for control of the pump.

In a preferred embodiment, the opposed sidewall portions are formed by a common housing part and the control member is a swash block. The actuating member is a trunnion shaft.

In accordance with yet another aspect of the invention, a hydrostatic transmission is provided comprising a pump, a motor, and a housing containing the pump and at least a part of the motor. The pump includes an input shaft extending from a bottom side of the housing, the input shaft having a drive wheel fixed for rotation therewith and connectable to a prime mover, such as an internal combustion engine. The prime mover, when coupled to the drive wheel, may have its center of gravity disposed lower than if the drive member was located on an output shaft extending from a top side of the housing. The hydrostatic transmission may be mounted in a vehicle along with the prime mover.

In accordance with still another aspesct of the invention, a hydraulic pump assembly is provided comprising a first pump, a second pump, a housing enclosing at least a portion of the first and second pumps, wherein the first and second pumps share a common sump within the housing.

In a preferred embodiment, the first and second pumps are connected to first and second motors thereby forming a first and second closed loop. At least one positive displacement charge pump is configured to supply fluid drawn from the common sump to the first and second closed loops. The common sump serves as a fluid reservoir and the first input shaft and second input shaft are oriented parallel to each other.

According to a further aspect of the invention, a vehicle comprises a frame, a hydraulic pump including an input shaft and having a housing mounted to the frame with the input shaft extending from the bottom of the housing, and an engine mounted to the frame and coupled to a drive wheel on the input shaft of the motor.

Further features of the invention will become apparent from the following detailed description when considered in conjunction with the drawings.

DETAILED DESCRIPTION

Figure 1:
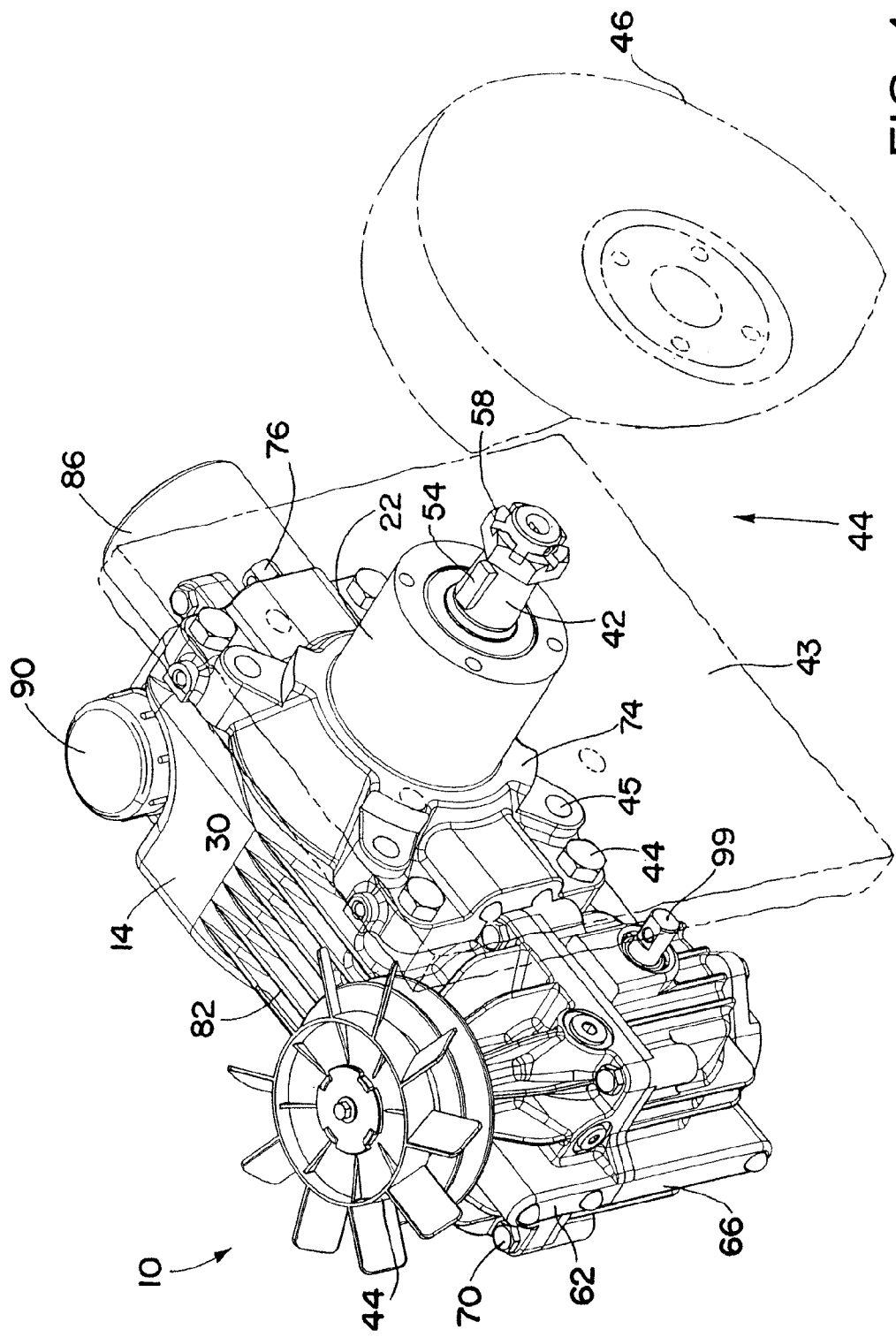
FIG. 1 is a perspective view of a hydrostatic transmission in accordance with the present invention, wherein an input shaft and an output shaft are oriented at 90 degrees relative to each other.
Figure 2:
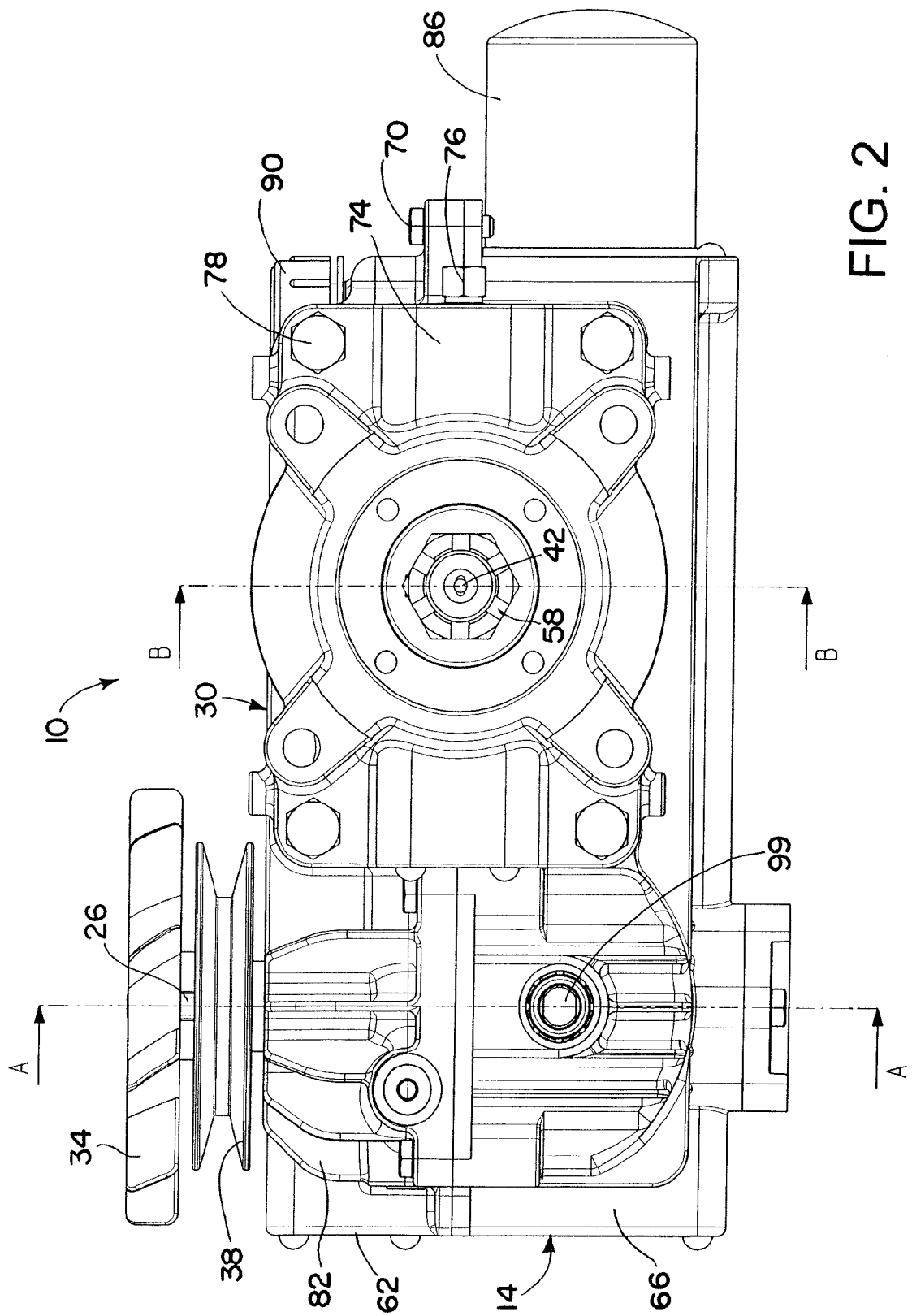
FIG. 2 is a side view of the hydrostatic transmission of FIG. 1.
Figure 3:
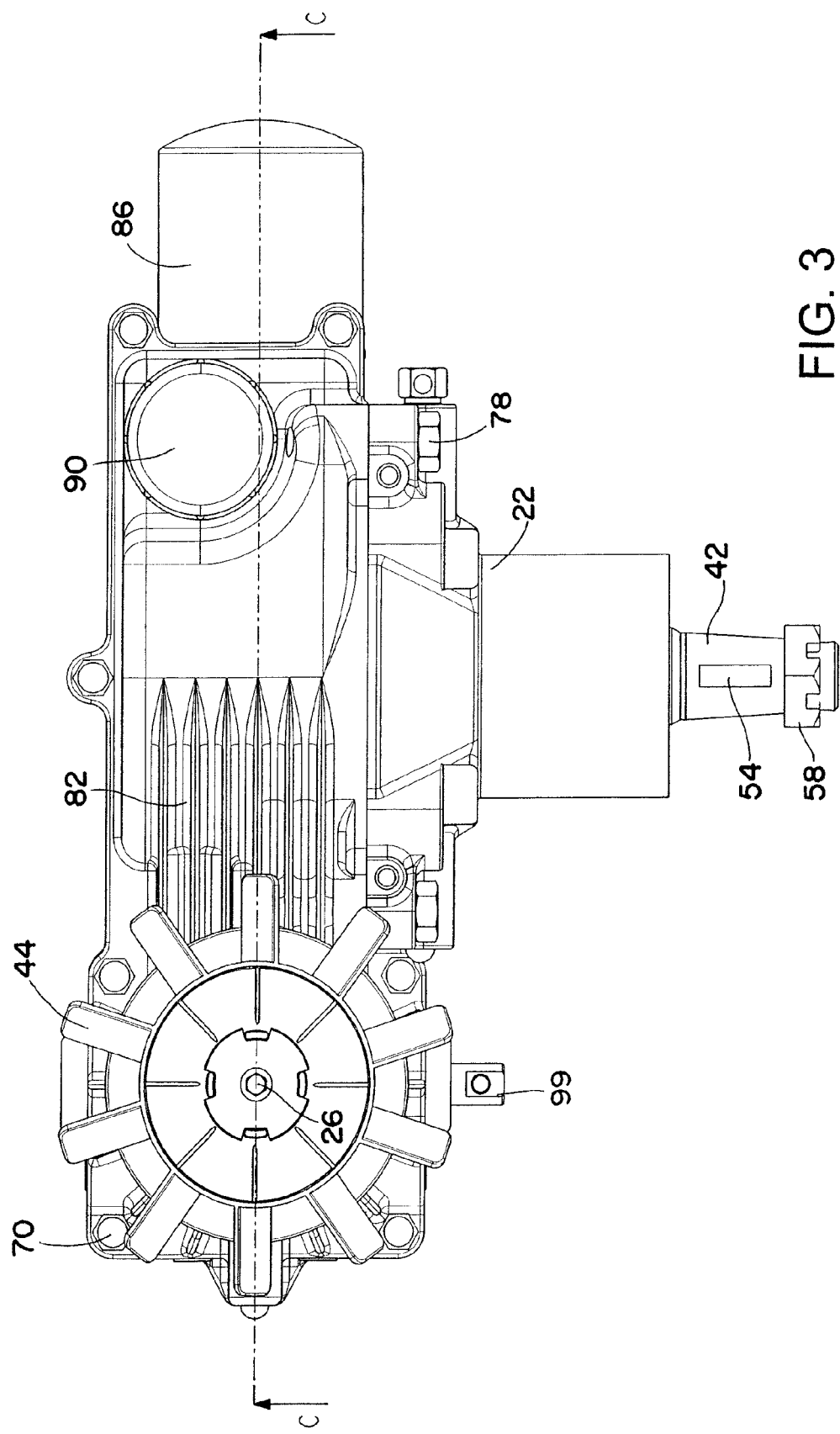
FIG. 3 is a top view of the hydrostatic transmission of FIG. 1.
Figure 4:
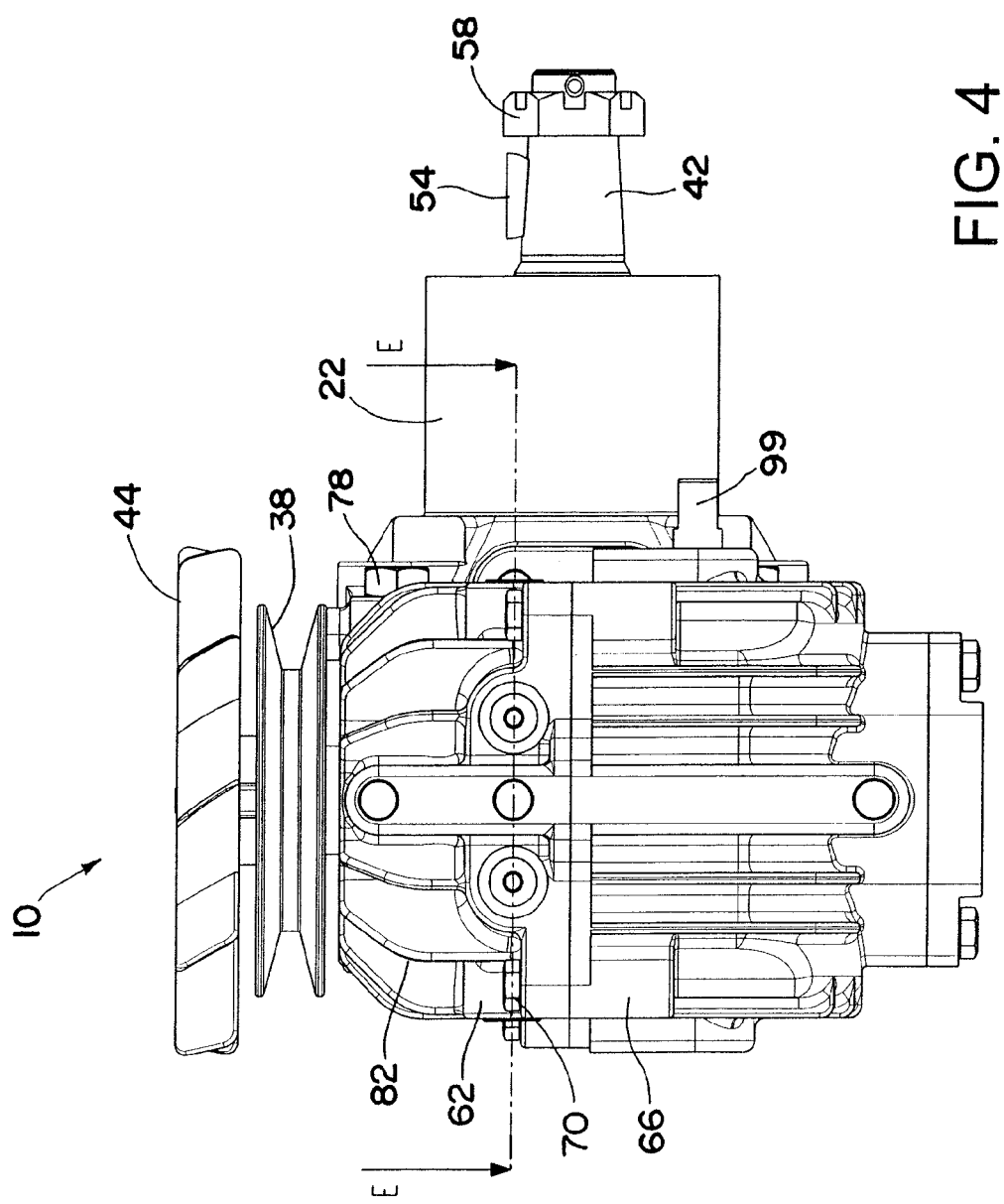
FIG. 4 is a front view of a the hydrostatic transmission of FIG. 1.

Referring now to the drawings in detail, and initially to FIGS. 1-4, an exemplary integrated hydrostatic transmission (herein referred to as IHT) 10 will be described. The IHT 10 comprises a housing 14 containing a reversible pump 18 fluidly connected to a motor 22 in a closed loop hydraulic circuit. An input shaft 26 for driving the pump 18 extends vertically from a top 30 of the housing 14 and includes a fan 34 and pulley 38. The pulley 38 can be connected by a belt to a prime mover, such as an internal combustion engine of a vehicle (not shown), for turning the input shaft 26. An output shaft 42 driven by the motor 22 extends horizontally from a side of the housing 14. As will be appreciated, the pump 18 supplies pressurized hydraulic fluid to an inlet of the motor 22 for driving the output shaft 42.

IHT 10 can be mounted to a frame 43 of a vehicle, generally indicated by reference number 44, using bolt holes 45 through which bolts can extend to secure the IHT 10 to the vehicle frame 43. A wheel 46 can be mounted to an outer axle portion of the output shaft 42 of the IHT 10 for supporting the vehicle 44 for movement over the ground. In the illustrated embodiment, the output shaft 42 has a tapered portion provided with a key 54 that engages in a key slot in the hub of a wheel 46 so that the wheel 46 will rotate with the output shaft 42. The wheel 46 can be secured in place by means of a nut 58 which is threaded onto the end of the axle output shaft 42.

Figure 7:
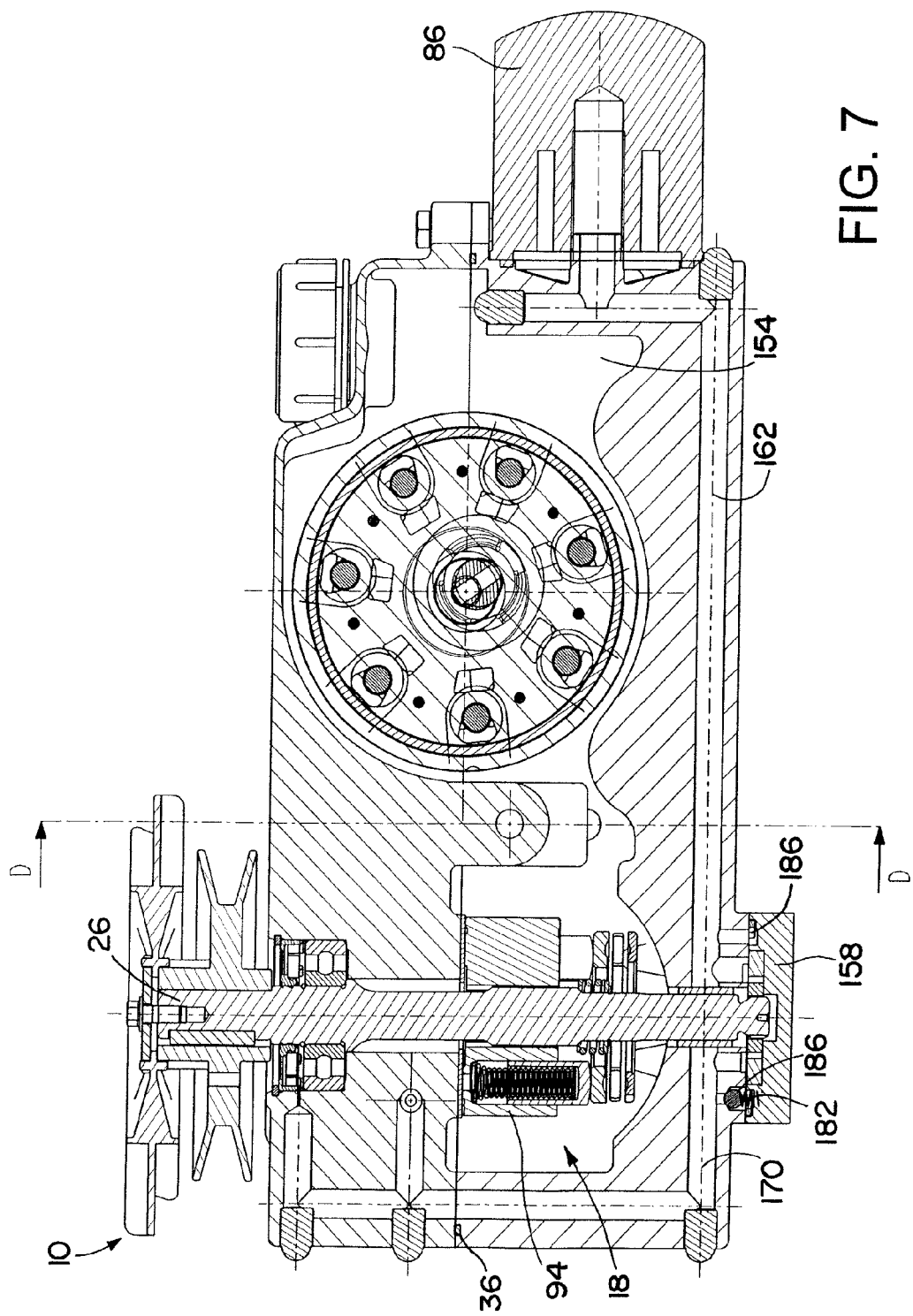
FIG. 7 is a cross-sectional view taken along the line C-C in FIG. 3.

The housing 14 of the IHT 10 includes an upper housing part 62 and a lower housing part 66 secured together with bolts 70, or by other suitable means. A sealing gasket 72 is typically provided at the interface of the upper housing portion 62 and the lower housing portion 66. The upper housing portion 62 and the lower housing portion 66 together form a generally circular opening into which the motor 22 is received. The opening is closed by a mounting plate 74 that carries the motor 22. The mounting plate 74 is secured to the upper housing portion 62 and the lower housing portion 66 by bolts 78, or by other suitable means. A sealing gasket 75 (FIG. 7) is provided at the interface of the upper housing portion 62, the lower housing portion 66, and the mounting plate 74. The mounting plate 74 may be provided with a bypass valve 76 for creating a short fluid circuit in the motor 22 to allow free rotation of the output shaft 42 when desired.

The upper housing portion 62, the lower housing portion 66, and the mounting plate 74 together form a sealed interior space of the housing 14 that contains the motor 18 and pump 22. The interior of the housing 14 serves as a shared sump for the motor 22 and the pump 18, and further may function as a reservoir.

The housing 14 further includes cooling fins 82 at various locations, generally on the top surface 30 near the fan 34, for assisting in dissipating heat generated during operation of the pump 18 and motor 22 of the IHT 10. As will be described below, the housing 14 can further include an externally mounted oil filter 86 for filtering the hydraulic fluid of the IST 10. The externally mounted oil filter 86 can be easily accessed for replacement when the filter becomes dirty. A breather 90 is provided for allowing air to exit and enter the housing 14 as necessary to compensate for thermal expansion and contraction of the hydraulic fluid. The breather 90 can also function as a fill cap for adding hydraulic fluid to the shared sump. Although not shown, a drain plug can be included at the bottom of the housing 14 for draining the hydraulic fluid so that fresh hydraulic fluid can be added to the housing 14.

Figure 5:
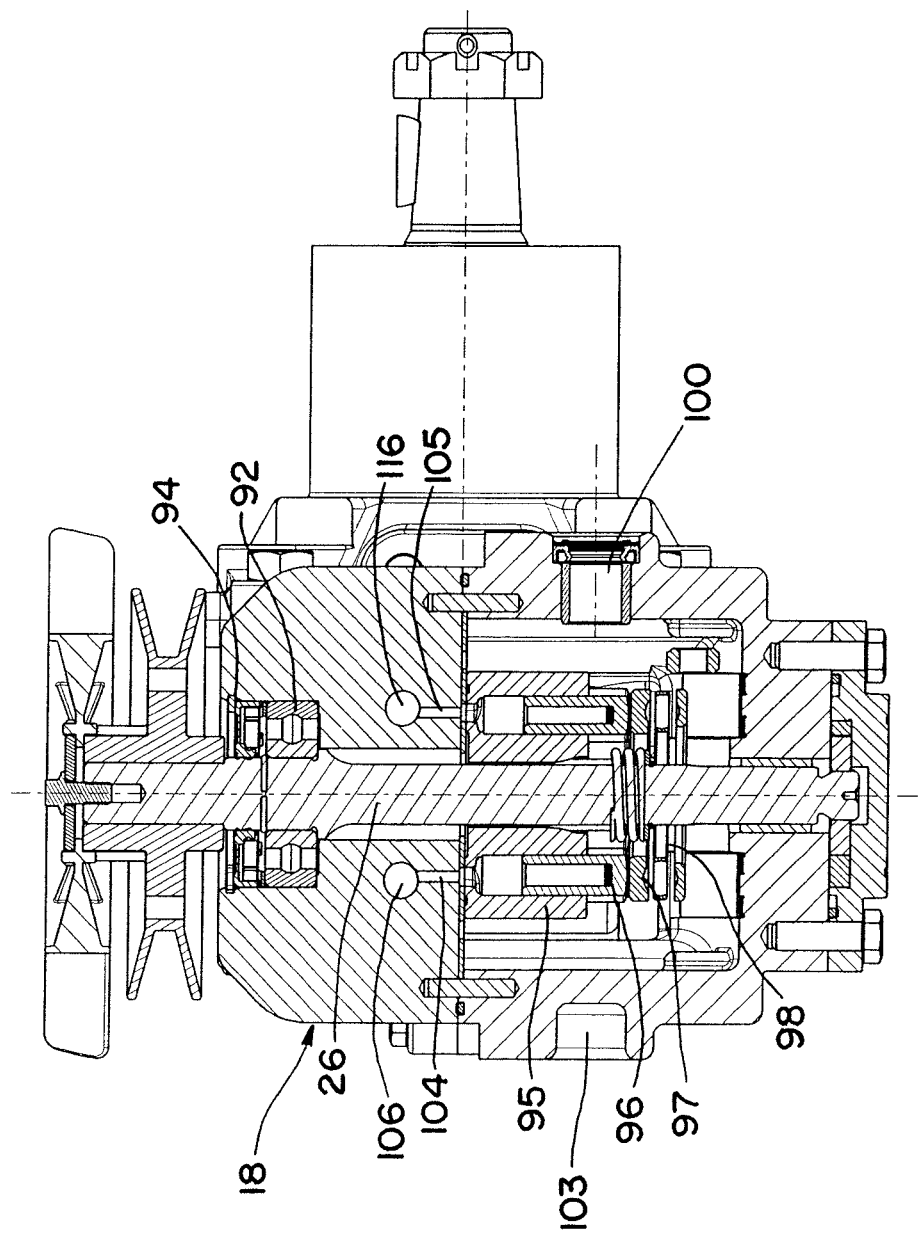
FIG. 5 is a cross-sectional view taken along the line A-A in FIG. 2.
Figure 6:
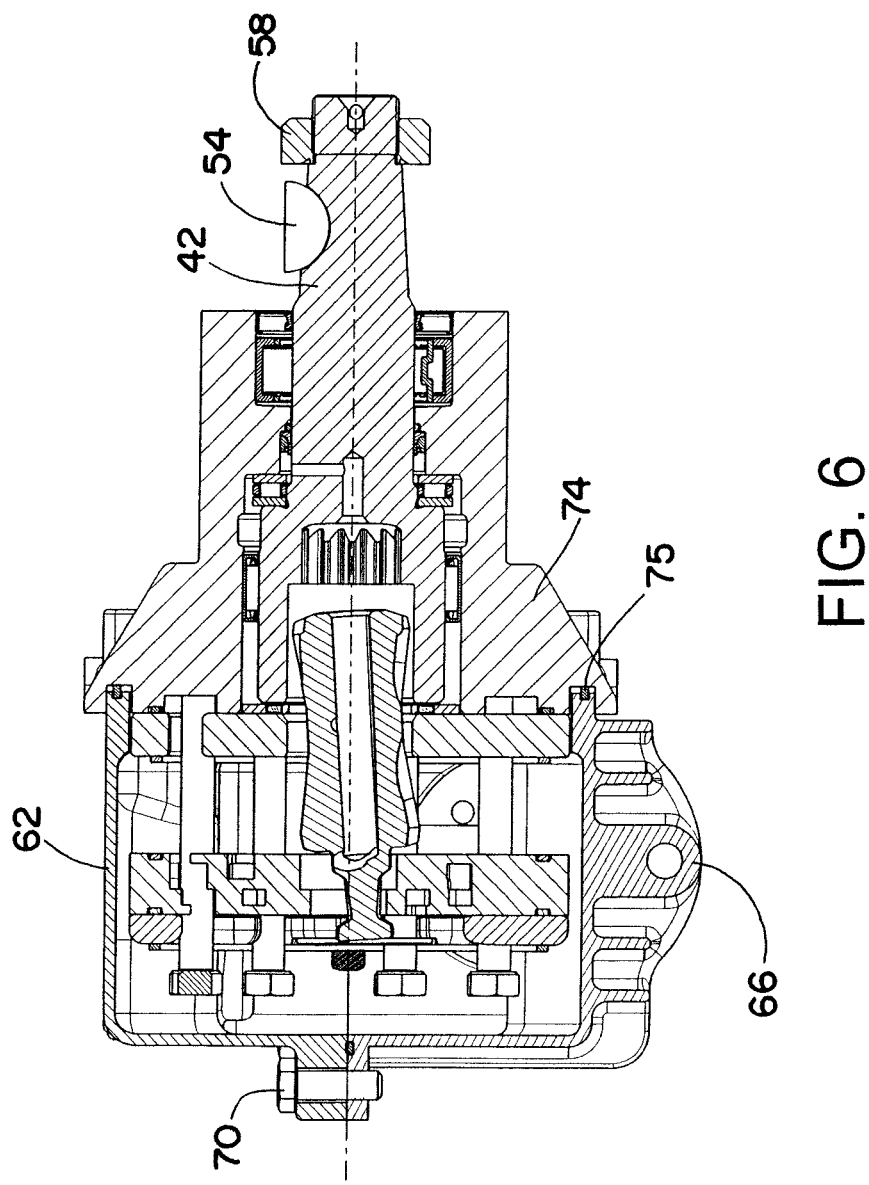
FIG. 6 is a cross-sectional view taken along the line B-B in FIG. 2.

Turning now to FIGS. 5-10, internal details of the IHT 10 will be described. FIG. 5 is a cross-sectional view of the pump portion of the IHT 10 showing the pump 18 and input shaft 26. In the illustrated embodiment, the pump 18 is a variable flow reversible piston pump. The input shaft 26 is supported in the upper housing portion 62 by a bearing 92, and a seal 94 is provided to seal the shaft 26 to the housing 14 to prevent fluid from escaping from the interior of the housing 14. A cylinder barrel 95 having a plurality of pistons 96 mounted for reciprocal movement therein is coupled to the input shaft 26 for rotation therewith. The input shaft 26 extends through a swash-block 97 which serves as a control member for controlling pump flow output. A thrust bearing 98 supports the input shaft 26 below the swash block 97.

The swash block 97 is arranged such that the pistons 96 of the cylinder barrel 95 abut its upper surface. The swash block 97 is connected by a linkage to an actuating member which in the illustrated embodiment is a trunnion shaft 99 (FIG. 1). For further description of the linkage between the trunnion shaft 99 and the swash block 97, reference may be had to U.S. Pat. No. 6,766,715 issued Jul. 27, 2004, which is hereby incorporated herein by reference.

Trunnion shaft 99 protrudes from the housing 14 through a hole 100 in the lower housing part 66 (linkage and trunnion shaft 99 not shown in FIG. 5). The hole 100 can be preformed in the lower housing part 66, or may be bored as desired. As will be appreciated, the swash block 97 can be inclined in both directions from its neutral point, or zero-inclination (the horizontal plane in FIG. 5). Rotation of the trunnion shaft 99 in one direction inclines the swash block 97 such that the pump 18 pumps fluid in a first direction, while rotation of the trunnion shaft 99 in the opposite direction inclines the swash block 97 such that the pump 18 pumps fluid in the opposite direction. As will be further appreciated, suitable control means can be connected to the trunnion shaft 99 for allowing an operator of a vehicle to rotate the trunnion shaft 99 as desired.

The lower housing part 66 of the IHT 10 includes opposing side wall portions 101 and 102. The trunnion shaft 99 can extend from the side wall 102 of the housing 14 as shown, or alternatively may extend from the opposing side 101 of the housing 14. By way of further example, two trunnion shafts (and corresponding linkages) can be provided, each trunnion shaft extending from an opposite side wall 101 and 102 of the housing 14. In this regard, a preformed recess, such as recess 103 in the illustrated embodiment, can be provided in which a through hole can be located if desired. The location of the preformed recesses can correspond to a location at which the actuating member, once installed in the through-hole, can be coupled to the control member for control of the pump.

Figure 8:
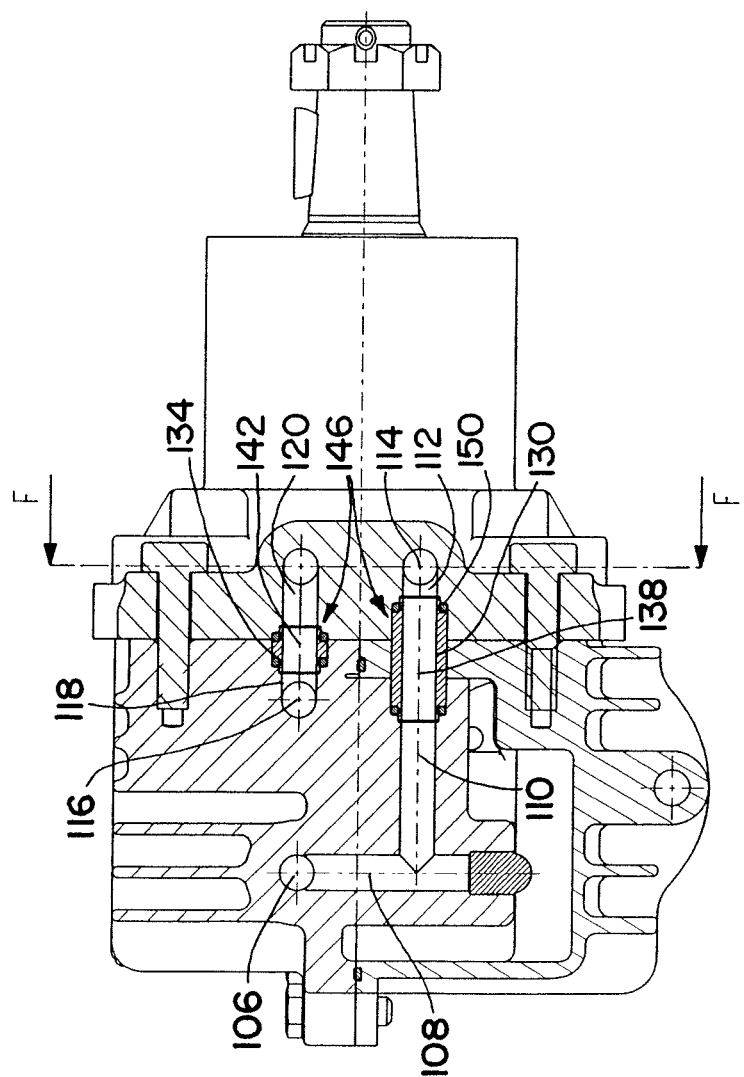
FIG. 8 is a cross-sectional view taken along the line D-D in FIG. 7.
Figure 9:
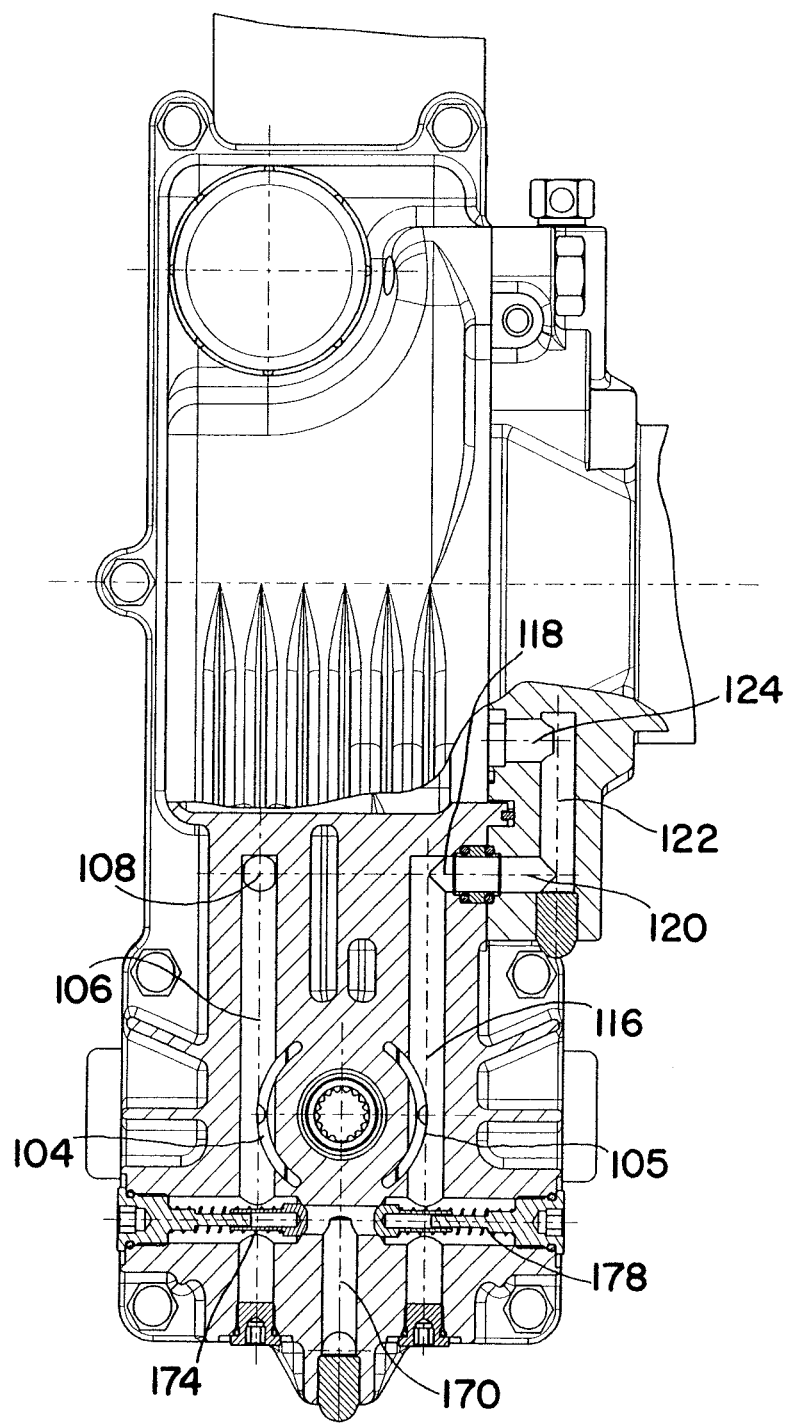
FIG. 9 is a cross-sectional view taken along the line E-E in FIG. 4.
Figure 10:
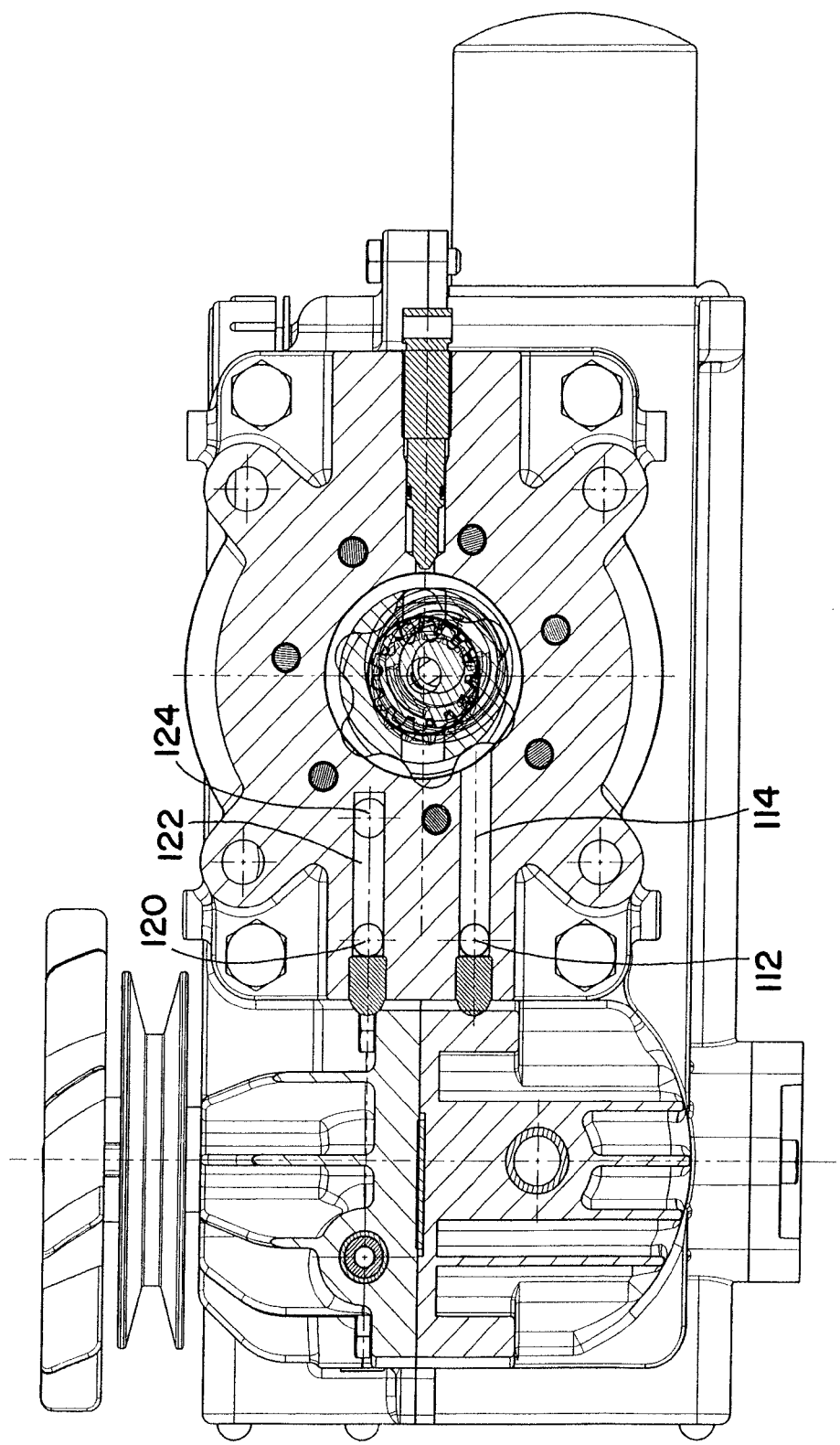
FIG. 10 is a cross-sectional view taken along the line F-F in FIG. 8.

Turning to FIGS. 5 and 8-10, it will be appreciated that pressurized fluid is supplied to the motor 22 from the pump 18 via passageways formed in the upper housing member 62 and the mounting plate 74. In particular, a first passageway between the pump 18 and the motor 22 begins at pump pressure port 104. Pump pressure port 104 connects to a passageway 106 in the upper housing member 62 as seen in FIG. 5. Passageway 106 connects to passageway 108 which in turn connects to passageway 110. Passageway 110 connects to passageway 112 in the mounting plate 74, as best seen in FIGS. 8 and 9. As shown in FIG. 10, passageway 114 connects to a pressure port of the motor 22 (not shown).

Returning to FIG. 5, a second passageway between the pump 18 and motor 22 begins at pump pressure port 105. Pump pressure port 105 connects to passageway 116 in the upper housing member 62. Passageway 116 connects to passageway 118, which in turn connects to passageway 120 in the mounting plate 74, as seen in FIGS. 8 and 9. Passageway 120 connects to passageway 122 which in turn connects to passageway 124 and thereby to the other pressure port of the motor 22, as seen in FIG. 10. In this manner, a closed loop hydraulic circuit is formed between the pump 18 and the motor 22 by the first and second passageways.

As shown in FIG. 8, seal inserts 130 and 134 are provided for sealing the connections between fluid passageways 110 and 112 in the lower housing part 66, and fluid passageways 118 and 120 in the upper housing part 62, respectively. The seal inserts 130 and 134 include passageways 138 and 142 that extend from an opening at one end of the seal inserts 130 and 134 to an opening at the other end of the seal inserts 130 and 134 for providing a flow passage therethrough. Counterbores 146 are provided in the faces of the mating surfaces of the upper housing portion 62 and the mounting plate 74 for receiving and axially positioning the seal inserts 130 and 134. Sealing elements, such as O-rings 150, are disposed at each end of the seal inserts 130 and 134 for sealing an outer diameter of the seal inserts 130 and 134 to an inner diameter of the respective passageways formed in the upper housing portion 62 and the mounting plate 74. In illustrated embodiment, the O-rings 150 are retained in circumferential notches at the terminal ends of the seal inserts 130 and 134. By way of further example, the O-rings could be retained in circumferential recesses in the outer diameter of the seal inserts 130 and 134. The seal inserts 130 and 134 described above can be utilized in other applications for sealing a fluid connection between mating housing parts.

During operation of the IHT 10, the prime mover (not shown) drives the input shaft 26 via pulley 38 which in turn rotatably drives the pump 18. As the trunnion shaft 99 is rotated, the hydraulic pump supplies hydraulic fluid via either the first or second passageways to the motor 22, depending on the direction of rotation of the trunnion 99. The motor 22 in turn drives the output shaft 42.

As will be appreciated, during normal operation of the IHT 10 some fluid leakage from the pump 18, the motor 22 and/or the first and second passageways is common, or even desired. Returning to FIG. 7, it will be recalled that the pump 18 and motor 22 of the present invention share a common sump 154 within the housing 14. The common sump 154 in the illustrated embodiment is formed by interior surfaces of the upper housing member 62, the lower housing member 66, and the mounting plate 74. Fluid leakage from the hydraulic circuit drains to the common sump 154 where it can be returned to the closed loop as make-up flow to replenish the fluid in the closed circuit. To this end, a charge pump 158 may be provided for supplying fluid drawn from the sump 154 to the closed loop.

In the illustrated embodiment, the charge pump 158 is a positive displacement pump also driven by the input shaft 26. A charge pump inlet line 162 formed in the lower housing member 66 is connected via filter 86 to the common sump 154. A charge pump outlet passage 170 also formed in the lower housing member 66 is connected to pump pressure ports 104 and 105 via check valves 174 and 178, as best seen in FIG. 9. The charge pump 158 supplies a steady flow of hydraulic fluid to the pump return line.

Fluid only flows into the closed loop when the pressure in the closed loop drops below a predetermined level. However, the charge pump 158 runs continuously whenever the input shaft 26 is being driven by the prime mover. As such, the charge pump 158 includes a pressure release bypass valve 182 and bypass passageway 186 for bypassing flow from the outlet passageway 170 to the inlet passageway 162 when the pressure in the outlet passageway 170 exceeds a predetermined level. For further details of the hydraulic circuit of the IHT 10, reference may be made to U.S. patent application Ser. No. 11/183,331, filed Jul. 15, 2005 entitled "HYDROSTATIC TRANSMISSION WITH BYPASS VALVE" which is hereby incorporated herein by reference in its entirety.

As will be appreciated, by drawing relatively cool fluid from the sump 154 and adding it to the closed loop, the charge pump 158 functions not only to maintain a desired operating volume of hydraulic fluid in the closed loop, but also to circulate the fluid between the sump 154 and the closed loop to facilitate cooling of the hydraulic fluid.

It will be appreciated that the charge pump 158 also distributes hydraulic fluid to the bearing 92 for cooling and lubrication. The fluid supplied to the bearing 92 also drains to the common sump 154.

Figure 11:
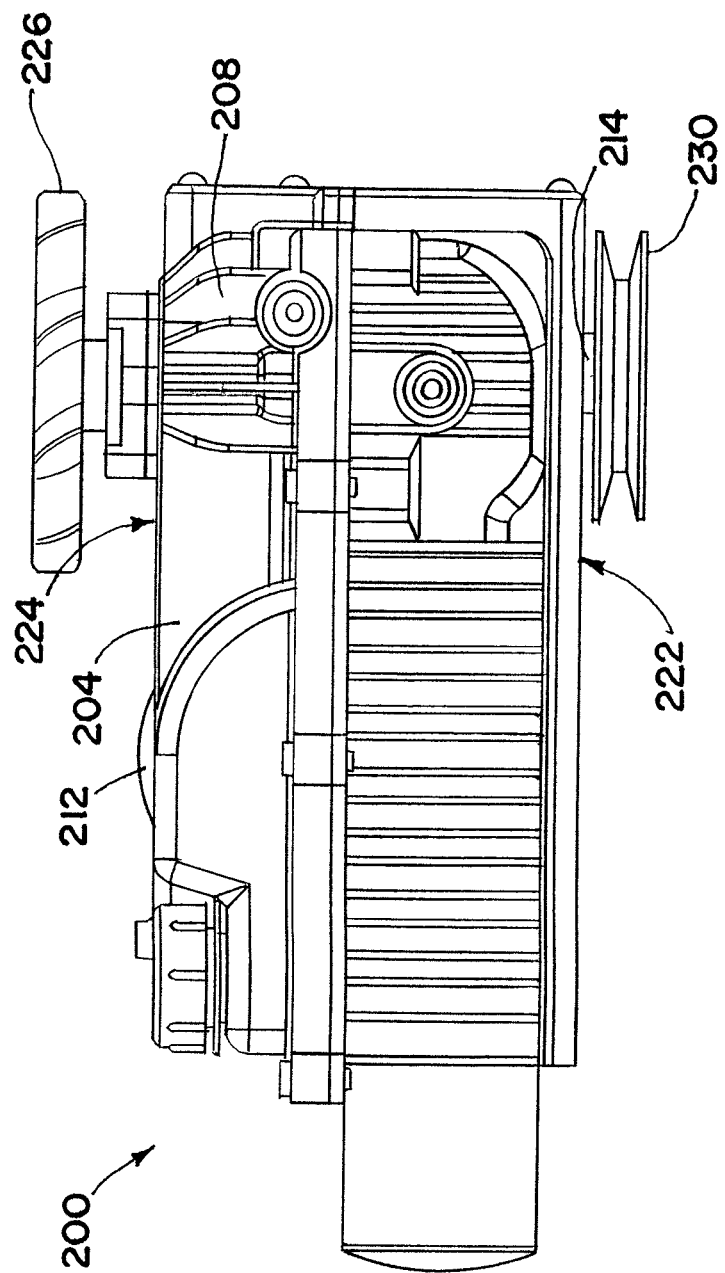
FIG. 11 is a side view of a hydrostatic transmission in accordance with the present invention, wherein a drive pulley is on an input shaft extending from a bottom side of the housing.

Turning now to FIG. 11, an IHT 200 is shown comprising a housing 204 containing a reversible pump 208 fluidly connected to a motor 212 in a closed loop hydraulic circuit. An input shaft 214 for driving the pump 218 extends vertically through a bottom side 222 and a top side 224 of the housing 204. The input shaft 214 includes a fan 226 on the portion thereof extending from the top side 224 of the housing 204. The input shaft 214 also includes drive wheel, such as a pulley 230, fixed for rotation therewith on the portion thereof extending from the bottom side 222 of the housing 204. As in the above embodiment, the pulley 230 can be connected by a belt to a prime mover, such as an internal combustion engine of a vehicle (not shown), for turning the input shaft 214 to drive the pump 208.

As will be appreciated, the external and internal details of IHT 200 are identical to the IHT 10 described above in FIGS. 1-10, with the exception of input shaft 214 extending through a bottom surface 222 of the housing 204. When installed in a vehicle and coupled to a prime mover, such as an internal combustion engine, the IHT 200 facilitates mounting of the prime mover such that its center of gravity may be disposed lower than if the pulley 230 was located on the portion of the input shaft 214 extending from the top side 224 of the housing 204.

Figure 12:
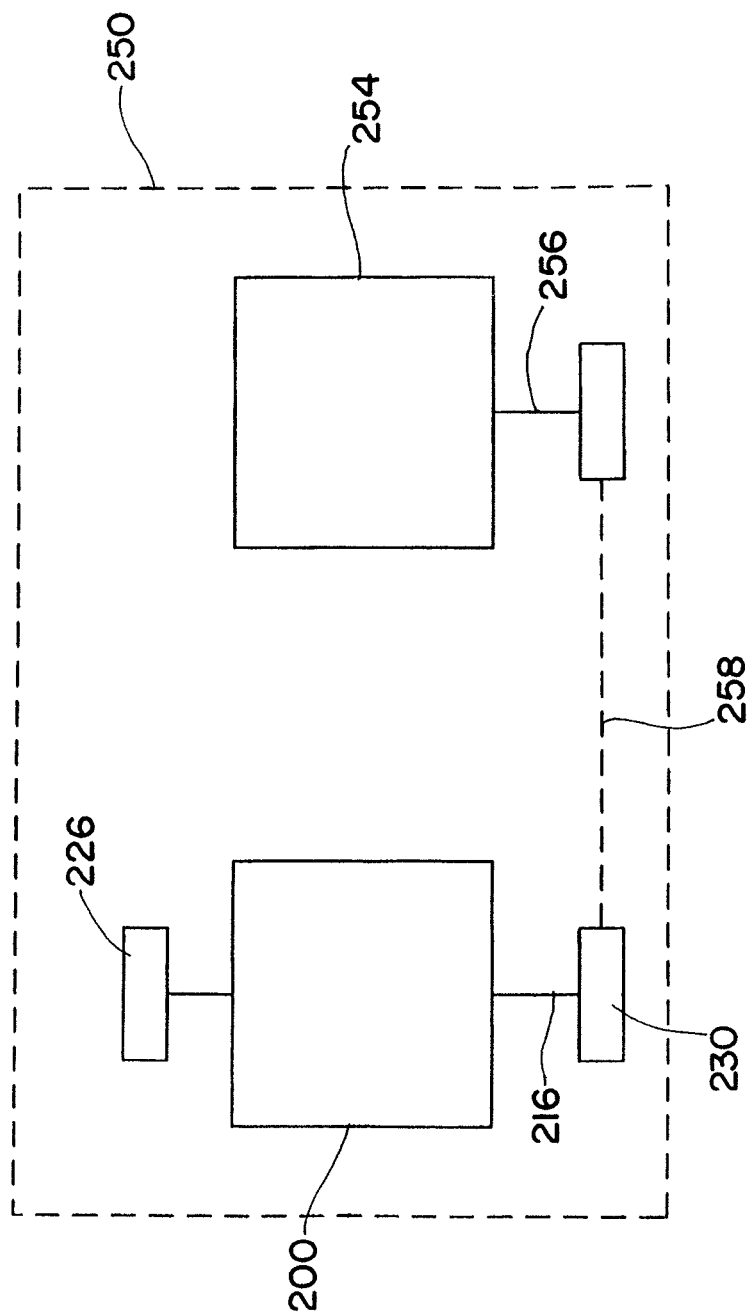
FIG. 12 a schematic diagram illustrating a vehicle including the hydrostatic transmission of FIG. 11.

Turning to FIG. 12, a schematic diagram of a vehicle 250 including the IHT 200 is shown. The vehicle 250, which may be a lawn mower, includes an engine 254 having a vertically aligned output shaft 256 extending downwardly from the bottom of the engine 254 and coupled to the pulley 230 mounted on the input shaft 216 of the IHT 200 by a belt 258. It will be appreciated that other methods of coupling the IHT 200 to the motor 254 are possible. By way of example, a sprocket can be substituted for the pulley 230 and a chain can be provided to couple the IHT 200 and the engine 254. As will be appreciated, because the pulley 230 and output shaft 256 generally should be aligned in a horizontal plane, by providing the pulley 230 below the IHT 200, the engine 254 can be located at a lower position than if the pulley 230 was located on an input shaft 216 extending from a top side 224 of the housing 204. Thus, the IHT 200 enables the overall center of gravity of the vehicle 250 to be lower which thereby can make the vehicle 250 more stable.

Figure 13:
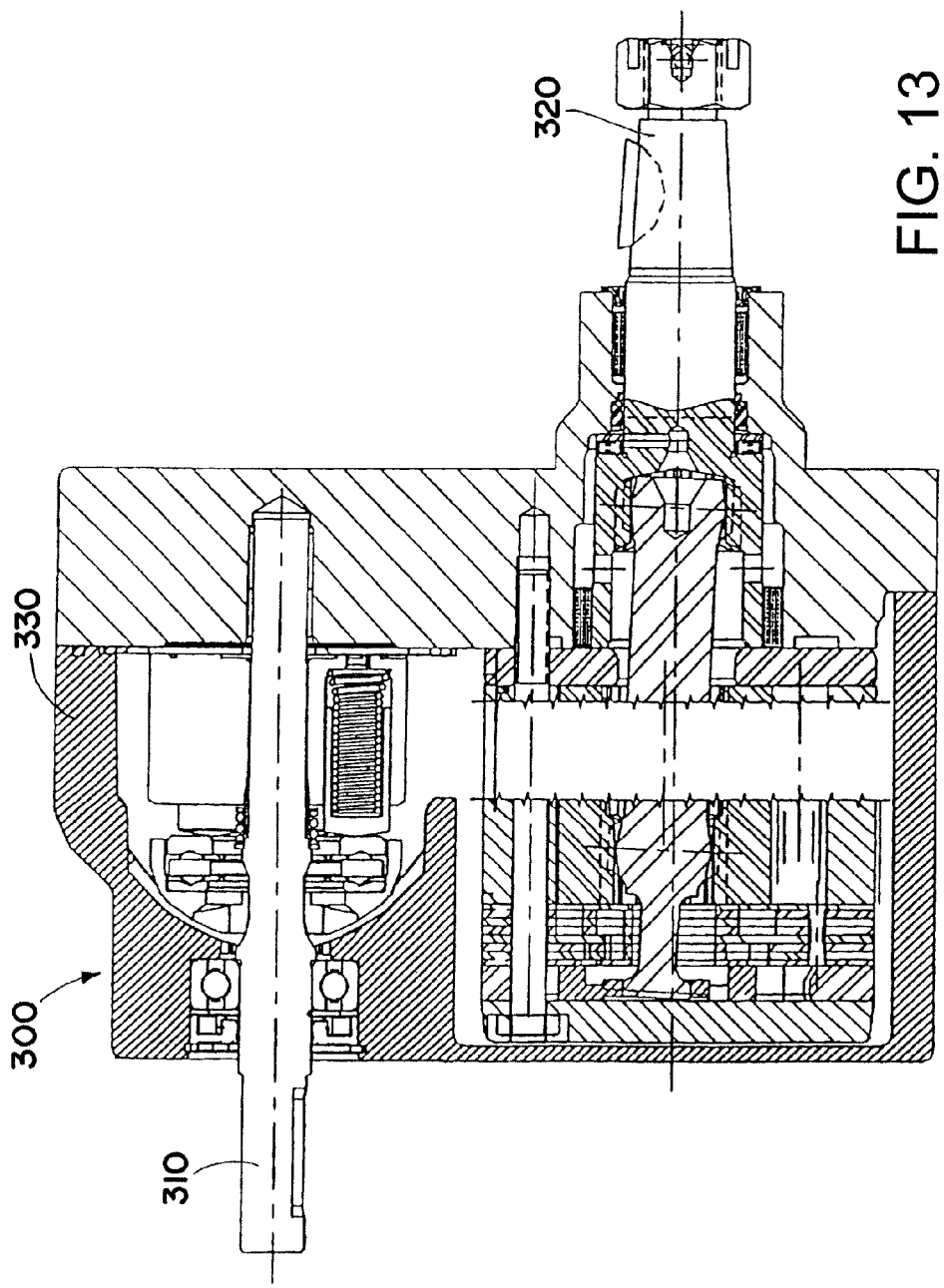
FIG. 13 is a is a cross-sectional view of another hydrostatic transmission in accordance with the present invention, wherein an input shaft and an output shaft are oriented parallel relative to each other.

Turning to FIG. 13, a hydrostatic transmission according to another embodiment of the present invention will be described. The IHT 300 is similar in all general aspects to the IHT 10 described above, with the exception of the input shaft 310 and output shaft 320 being oriented parallel to each other. In the illustrated embodiment, the input shaft 310 and output shaft 320 extend from opposite sides of the housing 330. It will be appreciated that other configurations are possible, such as the input shaft 310 and output shaft 320 being parallel and extending from a common side of the housing 330.

Figure 14:
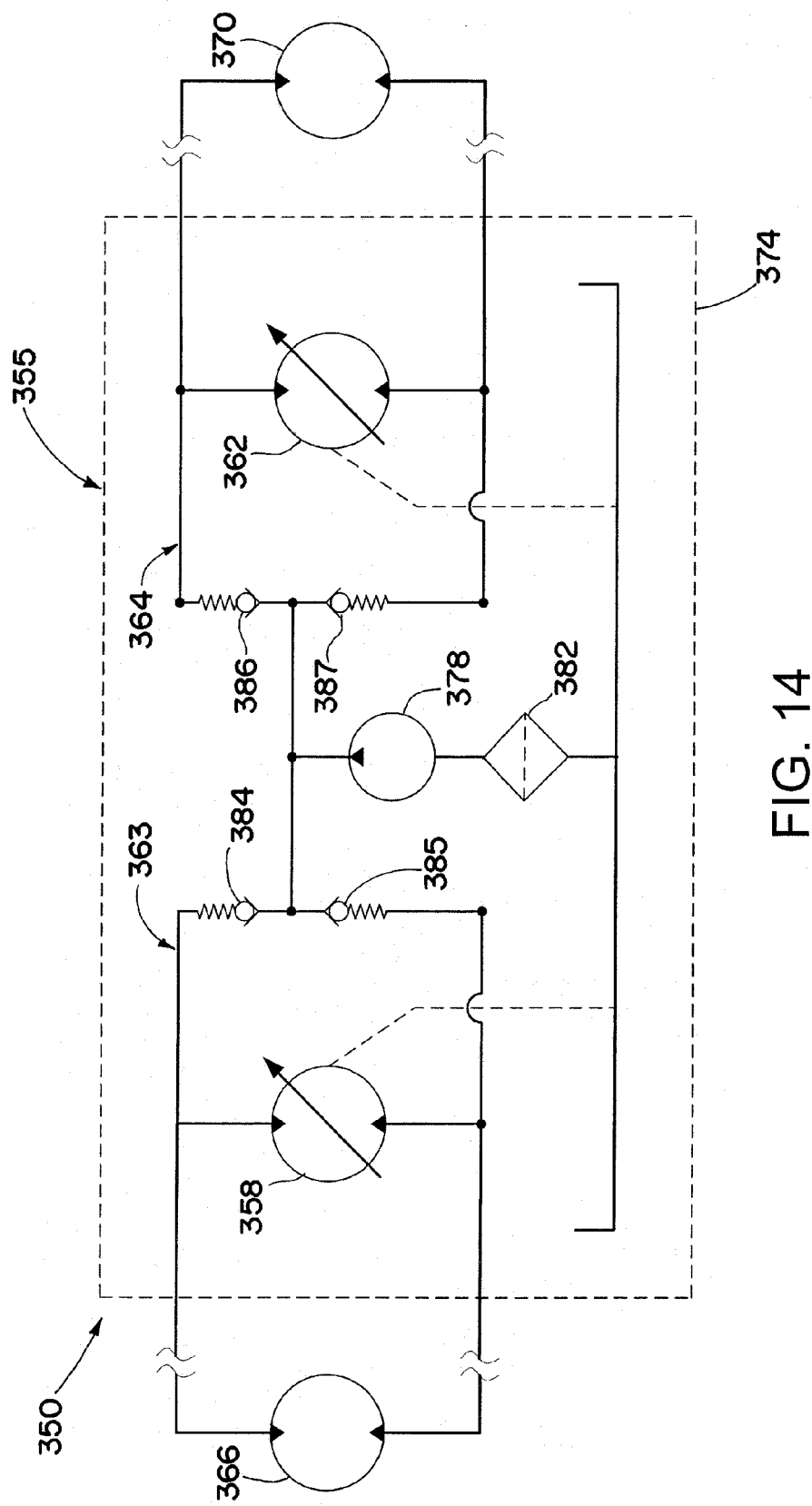
FIG. 14 is a schematic diagram illustrating a hydraulic circuit of a hydraulic pump assembly in accordance with the present invention.

Turning to FIG. 14, a schematic diagram is shown illustrating a simplified fluid circuit 350 of a hydraulic pump assembly 355 in accordance with the present invention. The fluid circuit 350 includes a first pump 358 and a second pump 362. The first and second pumps 358 and 362 are connected in closed hydraulic loops 363 and 364, respectively, via pressure lines to first and second motors 366 and 370 for supply and return of fluid. The pump assembly 355 also includes a common sump 374 for collecting any leakage from the first and second pumps 358 and 362.

A charge pump 378 is provided for supplying fluid drawn from the common sump 374 to the closed loops 363 and 364. A filter 382 can be provided as shown to filter the fluid drawn from the common sump 374. The charge pump 378 supplies flow to closed loop 363 via check valves 384 and 385, and to closed loop 364 via check valves 386 and 387. It will be appreciated that the arrangement of check valves permits flow of fluid from the charge pump 378 to the closed loops 363 and 364 only when the pressure in one of the lines of the closed loops drops below a predetermined pressure.

Figure 15:
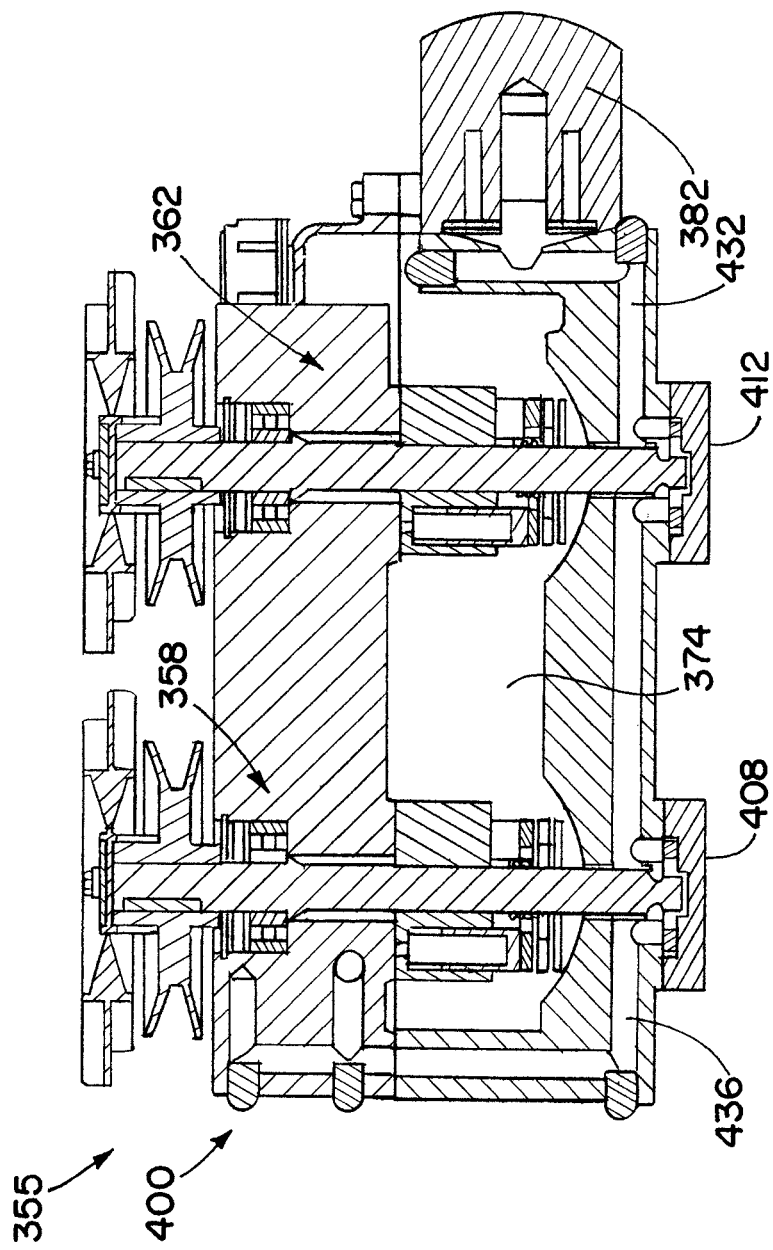
FIG. 15 is a cross-sectional view of a hydraulic pump assembly in accordance with the present invention.

Turning now to FIG. 15, the first and second pumps 358 and 362 of the hydraulic pump assembly 355 are contained within a housing 400. The pumps 358 and 362 in the illustrated embodiment are identical to the pump 18 as described above. However, it will be appreciated that a variety of different types of pumps may be used as desired. The pumps 358 and 362 can be connected via conventional porting and pressure lines to externally located hydraulic motors for the supply and return of pressurized fluid. It will be appreciated that the pumps 358 and 362, when connected to motors, are connected in first and second closed hydraulic loops, each hydraulic loop including a pump, a motor, and supply and return lines as described in relation to FIG. 14.

The interior of the housing 400 serves as the shared sump 374 for both pumps 358 and 362, and further may function as a reservoir. As such, any leakage from the pumps 358 and 362 is collected in the shared sump 374 where it can be returned to the first and second closed loops as make-up flow.

Accordingly, each pump 358 and 362 includes a charge pump 408 and 412 as for supplying fluid drawn from the shared sump 374 to the first and second closed loops in the manner described above in connection with the IHT 10 of FIGS. 1-10. Thus, fluid is drawn from the shared sump 374 through the filter 382 into a charge pump inlet line 432. The fluid is then pumped by the charge pumps 408 and 412 into a charge pump outlet line 436 and supplied to the pressure return line of the closed loops for providing makeup flow thereto. In some applications only one charge pump may be provided for supplying fluid drawn from the sump to the first and second closed loops.

The two pumps 358 and 362 can be driven separately by connecting each pump separately to one or more prime movers, such as internal combustion engines. The pump assembly 355 can also be provided with a single input, double output mechanism such as bevel gears or spur gears to thereby drive both input shafts together.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydrostatic transmission comprising a hydraulic pump, an input shaft for rotatably driving the hydraulic pump, an output shaft, a hydraulic motor for driving the output shaft, wherein the motor includes a driven shaft that has a portion forming the output shaft, and a housing enclosing at least a portion of the hydraulic pump and the entire hydraulic motor except for the portion of the driven shaft forming the output shaft, wherein the hydraulic pump and hydraulic motor share a common sump within the housing, wherein the output shaft extends through a wall of the housing in axial alignment with a rotational axis of the motor and has an axle portion to which a hub of a wheel of a vehicle can be mounted, and wherein the housing has a protruding tubular portion in which the output shaft is rotatably journalled, the protruding tubular portion being configured for extension through a frame of a vehicle for supporting the axle portion of the output shaft adjacent the hub when mounted thereto.

2. A hydrostatic transmission as set forth in claim 1, wherein the housing includes at least one passageway that fluidly connects the hydraulic pump and the hydraulic motor to form a closed hydraulic loop.

3. A hydrostatic transmission as set forth in claim 2, further comprising a positive displacement charge pump configured to supply fluid drawn from the sump to the closed loop.

4. A hydrostatic transmission as set forth in claim 1, wherein the hydraulic pump is a piston pump and the hydraulic motor is a gear motor.

5. A hydrostatic transmission as set forth in claim 1, wherein the housing includes a first housing portion having an opening, and wherein the hydraulic motor is part of a module attachable to the housing, the module including a mounting plate for closing the opening, the motor being carried by the mounting plate for installing and removing the motor as a unit.

6. A hydrostatic transmission as set forth in claim 1, wherein the input shaft and the output shaft are oriented at 90 degrees relative to each other.

7. A hydrostatic transmission as set forth in claim 1, wherein the input shaft and output shaft are oriented parallel to each other.

8. A hydrostatic transmission as set forth in claim 1, in combination with a vehicle including a frame, the hydrostatic transmission being mounted to the frame, and a wheel being mounted to the outer portion of the output shaft driven by the motor for supporting the vehicle for movement over the ground.

9. A hydrostatic transmission including a pump, a motor, and a housing containing at least one of the pump and the motor, the housing having first and second mating parts each including a fluid passageway for operatively fluidly connecting the pump and the motor, the fluid passageways of the first and second mating parts opening at respective counterbores to mating faces thereof, and a seal insert having at least one end portion extending into a corresponding one of the counterbores, the seal insert having an insert passageway that extends from an opening at one end of the insert to an opening at the other end of the insert for providing a flow passage therethrough, the ends of the insert passageway being in communication with the respective passageways of the first and second mating parts, wherein a sealing element is disposed at each end of the seal insert at a bottom of the respective counterbore for sealing the seal insert to the respective mating part, and wherein the mating faces of the first and second mating parts mate with each other.

10. A hydrostatic transmission as set forth in claim 9, wherein the both end portions of the seal insert extend into a respective counterbore axially positioning the seal insert with respect to the first and second mating parts.

11. A hydrostatic transmission as set forth in claim 10, wherein at least one of the first and second sealing elements are contained in a circumferential recess on an outer diameter of the seal insert.

12. A hydrostatic transmission as set forth in claim 10, wherein the sealing elements are O-rings.

13. A hydrostatic transmission comprising a pump, a motor having an output shaft, and a housing containing the pump and the entire motor except for the output shaft, the pump including an input shaft extending from a bottom side of the housing, the input shaft having a drive wheel fixed for rotation therewith and connectable to a prime mover, the output shaft extending through the housing at a right angle relative to the input shaft and in axial alignment with a rotational axis of the motor and having an axle portion to which a hub of a wheel of a vehicle can be mounted, whereby the prime mover, when coupled to the drive wheel, may have its center of gravity disposed lower than if the drive member was located on an input shaft extending from a top side of the housing, and wherein the housing has a protruding tubular portion in which the output shaft is rotatably journalled, the protruding tubular portion being configured for extension through a frame of a vehicle for supporting the axle portion of the output shaft adjacent the hub when mounted thereto.

14. A hydrostatic transmission as set forth in claim 13, mounted in a vehicle along with the prime mover.

15. A hydrostatic transmission as set forth in claim 1, wherein the housing defines an interior chamber for containing hydraulic fluid, the hydraulic pump and hydraulic motor each having at least a portion thereof extending into respective first and second portions of the interior chamber of the housing, and the sump is formed by the first and second portions of the interior chamber.

16. A hydrostatic transmission as set forth in claim 13, wherein the housing defines an interior chamber for containing hydraulic fluid, and the hydraulic pump and hydraulic motor each have at least a portion thereof extending into respective first and second portions of the interior chamber of the housing.

* * * * *